Dec. 8, 1970  M. SEBASTIANI  3,545,091
UNIVERSAL SPIRIT LEVEL
Filed May 29, 1968
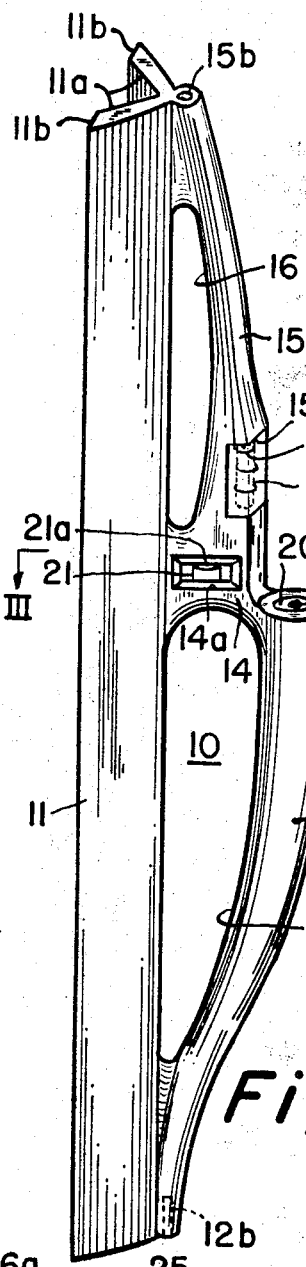
INVENTOR.
Martin Sebastiani
BY
Green, McCallister & Miller
HIS ATTORNEYS United States Patent Office 3,545,091
Patented Dec. 8, 1970

3,545,091
UNIVERSAL SPIRIT LEVEL
Martin Sebastiani, 1 Owingerstr.,
7770 Uberlingen, Germany
Filed May 29, 1968, Ser. No. 732,990
Claims priority, application Germany, June 6, 1967,
1,623,550
Int. Cl. G01c 9/24
U.S. Cl. 33—207                                   4 Claims

ABSTRACT OF THE DISCLOSURE

A leveling device is provided with a longitudinally-extending main body of angular or V-shape, with its recess or open portion facing towards a structural member to be aligned. The open portion has inner faces along its opposed sides that are planar and in about a 90° or right-angular relation. The outer edges of the faces are also planar and lie on a common plane. The device may either rest along its outer edges against the member to be aligned if the member is flat, or along the inner faces if the member is of convex shape or has an edge or corner along which the device is to be positioned. A primary handle extends at its outer end from one end of the body in a window-defining spaced relation therewith and is at its inner end connected to a central shoulder that extends transversely-outwardly from the body. A secondary handle extends at its outer end from the opposite end of the body in a window-defining spaced relation therewith and is connected at its inner end to the shoulder and in a transversely-inwardly or step-defining relation with the inner end of the primary handle. Tubular spirit level sight elements for horizontal and vertical alignment readings are carried in an adjacent relation by the shoulder and the secondary handle to provide rough alignment readings, and a block or cylindrical type of spirit level is positioned in a hollow portion of the adjacent inner end of the primary handle, so that it can be viewed looking upwardly or downwardly substantially along the tool device and may be employed for a final, full alignment determination from the standpoint of both vertical and horizontal planes and basically, in all directions. The outer ends of the primary and secondary handles are provided with openings or hole portions to removably-receive a pin of mounting means that may be employed to clamp on or grip the structural member being aligned for holding the device in a reading position, in order that a craftsman may have his hands free to adjust the structural member and secure it in place at an aligned position.

---

This invention relates to a universal type leveling device that will facilitate aligning or leveling operations using spirit level means and particularly, to an improved tool device that will facilitate a more efficient and precise alignment of structural members and components.

The conventional alignment or leveling device, as used by skilled craftsmen, employs so-called tubular spirit levels, and generally has a longitudinally-extending box-like body provided with transversely-opposed, longitudinally-extending, aligning sides. With such a device, it is necessary for structural members to be leveled on two sides, and the level has to be manually held in position on a structural member being aligned while such member is being nailed or in some other suitable way fixed in a properly aligned or leveled position. This requires either two craftsmen or an operation by one craftsman wherein he takes a reading and then by trial and error endeavors to properly fix the member at a level position or endeavors to hold the level with one hand and align and fix the member in position with the other hand.

There has been a need for a leveling or aligning device that will have a more universal type of utilization and that will simplify aligning operations and enable simultaneous effective sightings while the craftsman's hands are free for alignind a structural member and fixing it in a proper aligned position.

It has thus been an object of the invention to devise a universal type of leveling or aligning device that will enable more precise and efficient leveling and aligning operations by the craftsman;

Another object of the invention has been to provide a device which will simultaneously take readings in all directions in a single position on the structural member to be aligned and, at the same time, facilitate moving the member being aligned into a proper, desired, aligned position;

A further object of the invention has been to provide an aligning or levelling device that can be used while the hands of the craftsman are free;

A still further object of the invention has been to provide a leveling device with spirit levels of a type and in a coordinated relation such that accurate readings may be taken in a plurality of directions simultaneously when the device is in an abutting relation with the structural member to be aligned;

These and other objects of the invention will appear to those skilled in the art from the illustrated embodiment and the claims.

In the drawings, FIG. 1 is a vertical side view in elevation of a device constructed in accordance with the invention;

FIG. 2 is a top plan view on the scale of and of the device of FIG. 1;

FIG. 3 is an enlarged horizontal section taken along the line III—III of FIG. 1 and illustrating the mounting and construction of a tubular horizontal alignment reading spirit level element of the device;

FIG. 4 is a side view in elevation and FIG. 5 is a top view on the scale of FIGS. 1 and 4, illustrating mounting means for gripping or clamping the device on a structural member to be aligned;

And FIG. 6 is a reduced vertical view in elevation showing a fragment of a wall structure and how a device of the invention may be removably-positioned for an aligning operation on a structural member of such wall structure; this view also illustrates by dotted lines that the hands of an operator are then free to be used in aligning and fixing the structural member in a proper leveled relation, as determined from the device.

As shown particularly in FIGS. 1 and 5 of the drawings, I have provided a leveling, aligning tool or device 10 that has a longitudinally-extending base or main body 11 for resting on or for abutting engagement with a structural member to be leveled or aligned. As particularly indicated in FIGS 1, 2, and 3, the main body 11 is shown provided with a V or angle-shaped section whose wings, sides or legs 11a define an open portion or recess to receive a convex, projecting, corner or edge portion of the structural member. In this connection, opposed inner faces of the sides 11a are planar, have about a 90° relationship with each other, and terminates in outer edges 11b which are also planar. The edges 11b lie on a common plane to, if desired, rest on or abut a side or flat portion of a structural member to be aligned or leveled. Also, edges representing the opposite ends of the sides 11a lies on transverse planes that are perpendicular to the plane of the edges 11b.

A rounded primary handle 12 is, at its outer end, integrally-connected to one end of the main body 11 and is shaped to extend therefrom in a window-defining, spaced and substantially parallel relation. Window or open portion 13 defined by the primary handle 12 provides a relatively large size of and properly shaped opening which enables the craftsman to maintain a good hand grip on and about the handle 13. A mid or substantially centrally-positioned and transversely outwardly-extending shoulder 14 is also integral with the main body 11 and projects therefrom in a direction opposite to the projection of the legs or sides 11a. The inner end 12a of the handle 12 is shown of circular section and as provided with an exposed open end hole or bore portion to receive a so-called block or cylindrical type of spirit level 20 therein. The primary handle 12 is, adjacent its inner end, connected by a concavely-rounded portion to the shoulder 14 to form an integral structure therewith.

A secondly rounded handle 15 is, at its outer end, secured to or integrally formed to extend from the opposite end of the main body 11 and along a longitudinal axis substantially parallel to and in a window-defining spaced relation therewith. Window portion 16 is sufficient for entering the fingers of one (the left) hand about the rounded contour of the secondary handle 15. As shown, the handle 15, in effect, merges into the shoulder 14 in a transversely-inwardly-offset relation with respect to the primary handle 12, such that it has an offset or stepped relation with the inner end portion 12a of the primary handle 12. Thus, the primary handle 12 extends longitudinally along an axis that is in the same general plane as a longitudinal axis of extension of the secondary handle 15, but in a transversely-outwardly-spaced relation with respect to the axis of the secondary handle.

For enabling the device 10 to be securely-positioned or mounted along an edge 31 of a structural member, such as an expanded metal lathe or lattice member 30 of a vertical wall construction 32, I have provided mounting means at its opposite longitudinal ends in the form of inwardly-extending, open-end bore or hole portions 12b and 15b of the respective handles 12 and 15, and that extend substantially parallel to or along the longitudinal axis of the main body 11. Suitable gripping, clamping means or devices 25 may be removably-carried in associated portions 12b or 15b by means of a slide pin 27. Although any suitable gripping, clamping means or device may be used, including magnet means if the structural members are iron or steel, I prefer a spring grip type 25, such as shown in FIGS. 4 and 5.

Each device 25 has a pair of opposed operating arms 26 that are pivotally-mounted on headed pin 27 by clamping end portions 28 of a spiral spring 29 that is positioned on the pin 27. As shown in FIG. 5, the spring 29 normally resiliently urges opposed grip fingers 26a of the arms 26 into a closing position. The fingers 26a are of the same construction and each is provided with an inner gripping face 26b of a suitable shape that may depend on the general shape of structural members to be gripped. In FIG. 5, the faces 26b in their closed relation, define complementary gripping jaws that may approximately correspond in shape to the edge 31 of a structural member to be engaged.

It will be apparent as indicated in FIG. 6, that the device 10 may be firmly and securely held in a sighting or operating position on a structural member 30, in order that the operator, as indicated by the dotted lines in such figure, may have free use of both of his hands to properly align the structural member and also secure it in an aligned position while sighting the device. With the device 10, it is now possible to align or level columns, doors, windows, corner protector strips, etc., in all directions in a single operation, due to the adjacent special arrangement of the levels, the configuration of the sighting plane, and the use of a box level that has a right-angular relationship with the sighting plane. Since the box level 20 is installed in the inner end portion 12a of the handle 12, its bubble 20a is visible from the axial line of sight of the device and may be viewed simultaneously with bubbles 15a and 21a of adjacently-positioned tubular sights in the form of conventional, commercially-available, hermetically-sealed, tubular, bubble or spiirt level vial or capsule elements 21 and 22. As shown in FIGS. 3 and 6, the spirit bubble or level element 21 is positioned centrally within a rectangular-shaped, horizontally and through-extending window or opening 14a in the shoulder 14, and the spirit bubble or level element 22 is positioned in a rectangular-shaped, vertically-extending, recessed or cut-out portion in the front portion of the secondary handle 15. It will be noted that the tubular spirit bubble or level elements 21 and 22 and the box type spirit bubble or level element 20 have a relatively close grouping for central viewing. The handles 12 and 15 enable precise and flexible handling of the device 10 for its best positioning, and so that the eyes of the worker may follow the motion of his hand and at the same time make sightings. The main body of the tool 10 is also reinforced by the dual handle construction.

As noted, bubble 22a of the tubular sight 22 may be viewed from three sides, bubble 21a of the tubular sight 21 may be viewed from two sides, and bubble 20a of the box sight 20 may be viewed at a slight angle to the plane of the end portion 12a, as well as in the line or axis of sight or extension represented by the main body 11 and the handles 12 and 15. The tubular spirit sight level elements 21 and 22 and the box spirit sight level element 20 may be of conventional constructions with the usual liquid medium, air bubble and graduated, transparent container. Depending on whether the device 10 is being used on a vertical or a horizontal plane, the elements 21 and 22 serve for vertical and horizontal aligning and, vice versa. The elements 21 and 22 may used for obtaining somewhat rough alignment determinations, and the element 20 may be used for final and overall alignment determinations.

Although I have shown an embodiment of my invention for the purpose of illustration, it will be apparent to those skilled in the art that various changes, additions, subtractions or modifications may be made without departing from its spirit and scope.

I claim:

1. In a universal leveling device, a longitudinally-extending main body having planar faces along one longitudinal side thereof for positioning on a structural member to be aligned, a central shoulder extending transversely-outwardly from an opposite longitudinal side of said main body, a primary handle having an outer end connected to one end of said main body and extending longitudinally in an open-window-defining spaced relation along said body and connected along its inner end to said shoulder, a secondary handle having an outer end connected to the opposite end of said main body and extending longitudinally along said main body and connected at its inner end to said shoulder in a tranversely-inwardly-offset relation with respect to and for exposing the inner end of said primary handle, a tubular bubble level element in said secondary handle adjacent its connection to said shoulder for normally reading vertical alignment, a tubular bubble level element in said shoulder adjacent said primary and secondary handles for normally reading horizontal alignment, a box bubble level element in the exposed inner end of said primary handle for reading overall alignment, mounting means at the outer ends of said primary and secondary handles whereby the device may be secured on the member to be aligned; said mounting means comprising an open hole portion in the outer end of each of said primary and secondary handles, and a pair of member grip means, each provided with a mounting pin for removably-positioning it within an associated one of said hole portions.

2. In a universal leveling device as defined in claim 1, each of said member-gripping means having a pair of spring-pressed gripping fingers projecting transversely of said body towards the member to be aligned.

3. In a universal leveling device as defined in claim 1, said planar faces along said one longitudinal side of said main body defining an outwardly-open V-shape for positioning on the structural member to be aligned, and said open hole portions being located at the base of the outer ends of said primary and secondary handles.

4. In a universal leveling device, a longitudinally-extending main body having planar faces along one longitudinal side thereof for positioning on a structural member to be aligned, a central shoulder extending transversely-outwardly from an opposite longitudinal side of said main body a primary handle having an outer end connected to one end of said main body and extending longitudinally in an open-window-defining spaced relation along said body and connected along its inner end to said shoulder, a secondary handle having an outer end connected to the opposite end of said main body and extending longitudinally along said main body and connected at its inner end to said shoulder in a transversely-inwardly-offset relation with respect to and for exposing the inner end of said primary handle, a tubular bubble level element in said secondary handle adjacent its connection to said shoulder for normally reading vertical alignment, a tubular bubble level element in said shoulder adjacent said primary and secondary handles for normally reading horizontal alignment, a box bubble level element in the exposed inner end of said primary handle for reading overall alignment, the outer end of said primary handle and of said secondary handle each having an endwise-extending hole portion therein, spring clamp means provided for each end of the device and having a mounting pin for slide-positioning within the open end portion of an associated one of said handles, and each of said clamping means also having a pair of fingers to engage and clamp over the structural member to be aligned for securely holding the device in position thereon.

References Cited

UNITED STATES PATENTS

| | | | |
|---|---|---|---|
| 1,545,932 | 7/1925 | Williams | 33—207 |
| 1,640,020 | 8/1927 | Abrahamson | 33—207 |
| 2,624,953 | 1/1953 | Newcombe | 33—207 |
| 2,624,118 | 1/1953 | Anderson | 33—207 |

FOREIGN PATENTS

| | | | |
|---|---|---|---|
| 1,262,758 | 1961 | France | 33—211 |
| 417,982 | 1967 | Switzerland | 33—207 |

LEONARD FORMAN, Primary Examiner

D. A. DEARING, Assistant Examiner

U.S. Cl. X.R.

33—85, 211